United States Patent [19]
Levenson et al.

[11] Patent Number: 5,291,574
[45] Date of Patent: Mar. 1, 1994

[54] METHOD FOR MANUFACTURING STRIP OPTICAL WAVEGUIDES

[75] Inventors: Régine Levenson, Fontenay aux Roses; Julienne Liang, Fresnes; Alain Carenco, Bourg la Reine; Joseph Zyss, Sceaux, all of France

[73] Assignee: France Telecom, France

[21] Appl. No.: 981,755

[22] Filed: Nov. 25, 1992

[30] Foreign Application Priority Data

Nov. 27, 1991 [FR] France ................. 91 14662

[51] Int. Cl.⁵ ............................................. G02B 6/10
[52] U.S. Cl. ............................ 385/129; 156/630; 156/633; 156/662; 385/143; 385/145
[58] Field of Search ............... 385/14, 129, 130, 131, 385/132, 141, 142, 143, 144, 145; 156/628, 630, 633, 659.1, 662

[56] References Cited

U.S. PATENT DOCUMENTS

| | | | |
|---|---|---|---|
| 5,103,494 | 4/1992 | Mozer | 385/14 |
| 5,136,682 | 8/1992 | Moyer et al. | 385/141 |

*Primary Examiner*—John D. Lee
*Attorney, Agent, or Firm*—Blakely, Sokoloff, Taylor & Zafman

[57] ABSTRACT

In a method of manufacturing a planar optical waveguide based entirely on polymer materials an active polymer is deposited onto a semiconductor substrate between two layers of buffer polymers chosen so that the difference in refractive index on each side of the active polymer is between 0.005 and 0.5 and preferably between 0.01 and 0.4.

22 Claims, 1 Drawing Sheet

METHOD FOR MANUFACTURING STRIP OPTICAL WAVEGUIDES

BACKGROUND OF THE INVENTION

1. Field of the Invention

The invention concerns a method of manufacturing optical waveguides based on polymer materials.

2. Description of the Prior Art

Optical fibers are used not only to transmit data but also to process data in a very broad meaning of the term. Modulation, switching, multiplexing, repolarization, etc functions can therefore be implemented by associating an optical waveguide with integrated optical circuits.

Lateral confinement optical waveguides are conventionally implemented on the surface of monocrystalline lithium niobate by doping the crystal, usually with thermally diffused titanium. The refractive index of the doped region is increased so that this region can guide light in a certain range of wavelengths.

The guide structures previously used are mainly structures of the following types:

"photobleaching" structures based on lowering the refractive index of the active polymer after exposure to ultraviolet light;

"SPP" structures in which a metal strip is deposited onto the active layer; the active molecules in the material are oriented by applying an electric field between this strip and the substrate; the extraordinary index is increased under the metal strip whereas the ordinary index is reduced by the Pockels effect; the part of the active layer under the metal strip therefore becomes an optical waveguide for a TM wave (polarized in the plane of the layer);

"channel waveguide" structures in which the light is confined in the active polymer above the recessed part of the buffer layer by varying the effective index in this area.

The structures described above all have the same drawback: lateral confinement is poor because it is due to the relatively small refractive index difference (in the order of $5 \times 10^{-3}$). The present invention concerns a new technique for fabricating optical waveguides producing very large refractive index differences to either side of the active strip guide and improving lateral confinement by reducing light losses; the refractive index difference ($0.01 < \Delta n < 0.4$) varies with the materials employed. The lateral confinement property is crucial in the case of more complex components. In components such as electro-optic X junctions, in which the waveguides intersect at angles in the order of 1°, poor confinement of the light wave causes light to be lost from one waveguide to the other, producing crosstalk between channels.

SUMMARY OF THE INVENTION

In one aspect the present invention consists in a method of manufacturing a planar optical waveguide entirely based on polymer materials comprising the following steps:

depositing onto a semiconductor substrate a lower layer of low refractive index buffer polymer which is thereafter stabilized and dried and then cured at a temperature close to the glass transition temperature of said polymer;

depositing an active polymer adapted to be formed subsequently into strips onto the lower layer followed by curing to stabilize said active polymer without degrading its properties;

depositing a layer of silicon nitride ($Si_3N_4$);

depositing a photosensitive resin and then transferring the geometry of the strips to said resin by photolithography;

selectively etching the silicon nitride layer with $CF_4$ plasma, the strips being protected by the photosensitive resin;

selectively etching the photosensitive resin and the active polymer at the locations where the latter is not protected by the silicon nitride layer;

etching the polymer until the lower buffer polymer layer is exposed;

etching the silicon nitride layer protecting the active polymer strips;

depositing an upper layer of low index buffer polymer onto the resulting structure which is then cured at a temperature similar to that used to stabilize the active polymer.

The silicon nitride layer is preferably deposited by the plasma-sputtering technique. The other layers are preferably deposited by the spin-coating technique.

The active polymer curing temperature is preferably greater than 50° C. and even more preferably around 100° C.

In a preferred embodiment of the invention the semiconductor substrate is gallium arsenide (GaAs).

Depending on the intended application, the polymer materials constituting the guide may be passive materials or electro-optic materials. The strip guide may be a passive material, for example, with no electrostatic properties, such as polystyrene, when there is the requirement to integrate opto-electronic components, in particular to implement an optical waveguide, a polarizer or a splitter. On the other hand where there is the requirement to integrate an electro-optic material, a method in accordance with the invention comprises an additional step of orienting molecules in the strip guide to produce an electro-optic material. In this case the strip guide may be a material having a quadratic non-linearity such as polymethylmethacrylate doped with molecules having a high non-linear susceptibility in the case of a frequency doubler, a modulator, a switch, an electro-optical complex or a parametric amplifier or a material having a cubic non-linearity in the case of a Kerr modulator or an optical gate or a fluorescent material in the case of a tunable laser.

If the strip guide is made from a material having a quadratic non-linearity such as doped polymethylmethacrylate the latter may be doped with active molecules such as those shown below:

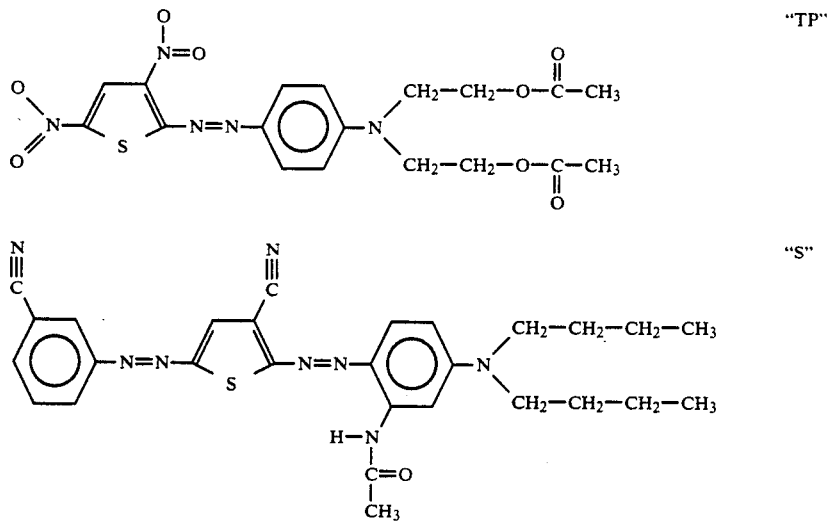

The buffer polymers must be compatible with the various layers and have a refractive index lower than that of the active polymer employed. According to one feature of the present invention the difference between the refractive indices of the lower and upper buffer polymer layers is between 0.005 and 0.5 and preferably between 0.01 and 0.4. The buffer polymer constituting the lower layer of the guide may be Spin On Glass (SOG), for example, which has a refractive index of 1.4 and the buffer polymer constituting the upper layer of the guide may be pure polymethylmethacrylate which has a refractive index of 1.49.

The active polymer constituting the guide strips is selected from polymers made up of molecules having a high dipolar moment and a second order non-linear susceptibility. These polymers may be free polymers or well grafted polymers.

In a preferred embodiment of the invention the active polymer is doped polymethylmethacrylate.

In one variant of the present invention an electrode is added either over all of the surface of the polymer constituting the upper layer of the guide or selectively to improve the bandwidth.

In another variant the guide has no control electrode on its upper layer and may be used as a passive optical waveguide.

In a second aspect the present invention consists in the use of a guide structure produced by the method defined hereinabove in which the strip guide is a passive material or a material having a quadratic non-linearity or a material having a cubic non-linearity or a fluorescent material.

The following examples and figures are intended to highlight other advantages and features of the present invention without limiting its scope.

DETAILED DESCRIPTION OF THE INVENTION

EXAMPLE 1

Example of one specific implementation of a method in accordance with the invention.

Figure 1:
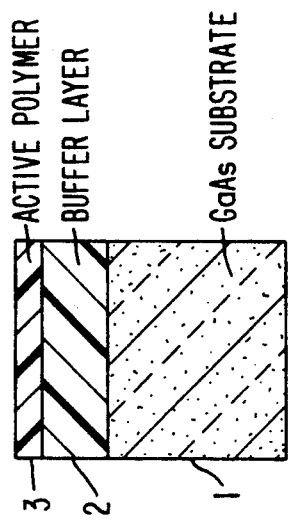

The method described here for obtaining optical waveguides in accordance with the invention uses the spin coating, photolithography and reactive ion etch techniques in the following process comprising six steps shown in FIGS. 1 through 6:

FIG. 1: a layer (2) of low index polymer such as SOG is spin coated onto a semiconductor, for example gallium arsenide, substrate (1). This layer is then stabilized and dried and then cured at high temperature (450° C. in the case of SOG). Doped PMMA constituting the active polymer (3) is spin coated onto the first layer and then a relatively high temperature to stabilize the layer, care being taken not to degrade the active molecules. In this example this temperature is 100° C.

Figure 2:
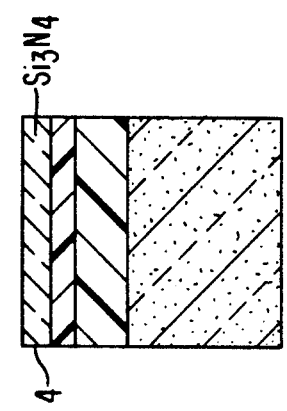

FIG. 2: a 0.15 μm layer (4) of silicon nitride ($SiN_4$) is deposited by the plasma sputtering technique.

Figure 3:
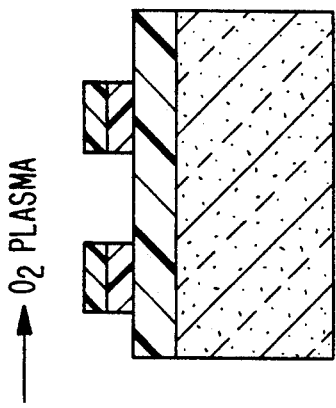
FIGS. 1 through 6 show one specific implementation of a method in accordance with the invention.

FIG. 3: a layer (5) of photosensitive resin is deposited by spin coating. The geometry of the strips is then transferred to the resin by photolithography.

Figure 4:
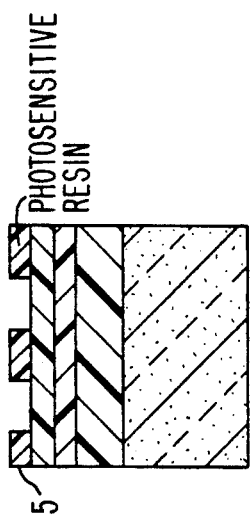

FIG. 4: the layer (4) of silicon nitride is selectively etched with $CF_4$ plasma. Etching stops at the level of the active polymer layer (3) and the strips are protected by the photosensitive resin.

Figure 5:
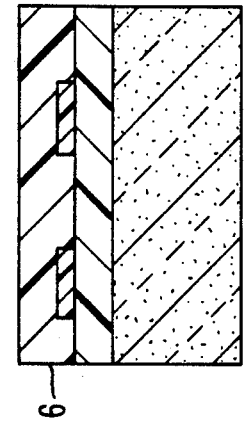

FIG. 5: the active polymer layer is then selectively etched with $O_2$ plasma. The active polymer is therefore etched at places where it is not protected by the silicon nitride layer. As the polymer etching rate is known (0.1 μm/mm), etching is discontinued immediately the lower layer is exposed.

Figure 6:
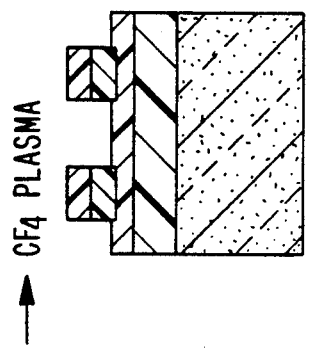

FIG. 6: final plasma etching eliminates the silicon nitride layer protecting the active polymer strips. A layer (6) of low index polymer is then spin coated onto the structure. This layer is cured at the same temperature as the active layer.

EXAMPLE 2

Molecule Orientation

The molecules of the active polymer may be oriented to produce an electro-optic material. This orientation may be effected using corona discharge involving the application of a high electrostatic field (in the order of 100 V/μm) for 30 minutes at a temperature near the glass transition temperature following which the field is maintained while the layer is cooled to ambient temperature.

EXAMPLE 3 Use of the Guide Structure in a Phase Modulator

A wave polarized at 45° is coupled into the optical waveguide by means of an electric field applied to the terminals of the active material after which the phase shift is modulated between the TE and TM polarizations detected at the output of the guide on the output side of a crossed polarizer.

Propagation losses in this structure have been evaluated as in the order of 1 to 2 dB/cm. The electro-optic coefficient of the polymer used is 7 pm/V which yields a voltage of 20 V for an active electrode over 1 cm. The geometry of the control electrodes is the parameter which determines bandwidth limiting. By improving the performance of the active material and optimizing the various layer thicknesses it is possible to work towards a control voltage in the order of one volt.

Using the same type of materials components such as integrated modulators, electro-optic X junctions, directional couplers, etc can be produced merely by changing the photo-etching mask.

There is claimed:

1. Method of manufacturing a strip optical waveguide entirely based on polymer materials comprising the following steps:
   depositing onto a semiconductor substrate a lower layer of low refractive index buffer polymer which is thereafter stabilized and dried and then cured at a temperature close to the glass transition temperature of said polymer;
   depositing a guiding polymer adapted to be formed subsequently into strips onto said lower layer followed by curing to stabilize said guiding polymer without degrading its properties;
   depositing a layer of silicon nitride ($Si_3N_4$);
   deposing a photosensitive resin and then transferring the geometry of said strips to said resin by photolithography;
   selectively etching said silicon nitride layer with $CF_4$ plasma, said strips being protected by said photosensitive resin;
   selectively etching said photosensitive resin and said guiding polymer at the locations where the latter is not protected by said silicon nitride layer;
   etching said polymer until said lower buffer polymer layer is exposed;
   etching said silicon nitride layer protecting said guiding polymer strips;
   depositing an upper layer of low index buffer polymer onto the resulting structure which is then cured at a temperature similar to that used to stabilize said guiding polymer.

2. Method according to claim 2 wherein said semiconductor of said substrate is gallium arsenide (GaAs).

3. Method according to claim 1 wherein said guiding polymer materials have electro-optical properties.

4. Method according to claim 3 wherein the active molecules in said guiding polymer are oriented to render said materials electro-optical, for example by corona discharge.

5. Method according to claim 4 wherein said corona discharge is applied for 30 minutes at a temperature near the glass transition temperature of said guiding polymer which is then maintained while said guiding layer is cooled to ambient temperature.

6. Method according to claim 1 wherein said lower buffer polymer layer is deposited by the spin coating technique.

7. Method according to claim 1 wherein said lower and upper buffer polymer layers comprise a polymer whose refractive index is lower than that of said guiding polymer.

8. Method according to claim 1 wherein said lower buffer polymer layer is of SOG (Spin On Glass).

9. Method according to claim 1 wherein said guiding polymer is selected from polymers made up of molecules having a high dipolar moment and a second order non-linear susceptibility.

10. Method according to claim 1 wherein said guiding polymer is doped polymethylmethacrylate.

11. Method according to claim 1 wherein said guiding polymer is spin coated onto said first layer of buffer polymer.

12. Method according to claim 1 wherein said silicon nitride layer is deposited by plasma sputtering approximately 0.15 μm thick.

13. Method according to claim 1 wherein said photosensitive resin is added by spin coating.

14. Method according to claim 1 wherein the upper buffer polymer layer is deposited by spin coating.

15. Method according to claim 1 wherein said upper buffer polymer layer is pure polymethylmethacrylate.

16. Method according to claim 1 wherein said upper and lower buffer polymer layers have a difference in refractive index between 0.005 and 0.5.

17. Method according to claim 1 wherein a metal control electrode is deposited on the top of the total strip waveguide structure.

18. Use of a guide structure obtained by the method according to any one of claims 1 to 17 in which the said guiding polymer is a passive material.

19. Use of a guide structure obtained by the method according to any one of claims 1 to 17 in which the said guiding polymer is a material having a quadratic non-linearity.

20. Use of a guide structure obtained by the method according to any one of claims 1 to 17 in which the said guiding polymer is a fluorescent material.

21. Method according to claim 1 wherein said upper and lower buffer polymer layers have a difference in refractive index between 0.01 and 0.4.

22. Method according to claim 1 wherein said upper and lower buffer polymer layers have a difference in refractive index greater than 0.1.

* * * * *